UNITED STATES PATENT OFFICE.

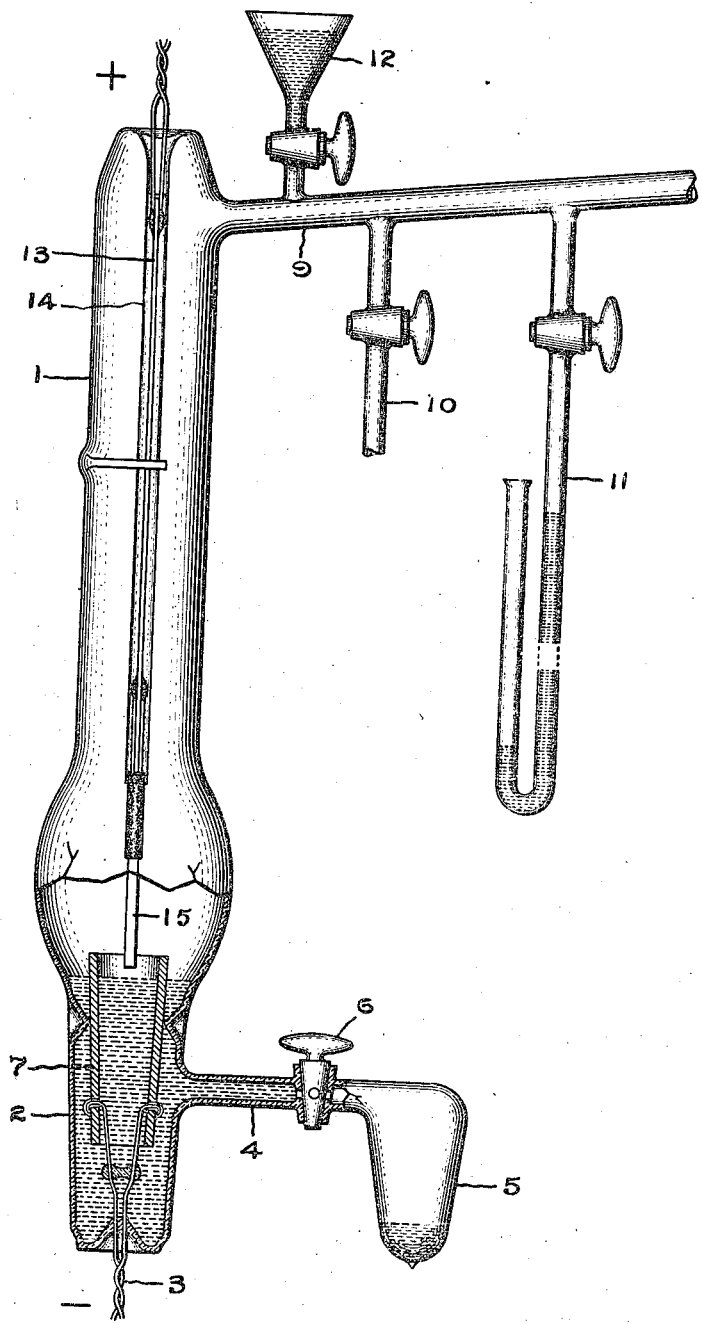

EZECHIEL WEINTRAUB, OF LYNN, MASSACHUSETTS, ASSIGNOR TO GENERAL ELECTRIC COMPANY, A CORPORATION OF NEW YORK.

TREATMENT OF REFRACTORY MATERIALS.

997,880.

Specification of Letters Patent. Patented July 11, 1911.

Original application filed December 4, 1906, Serial No. 346,253. Divided and this application filed October 27, 1909. Serial No. 524,948.

*To all whom it may concern:*

Be it known that I, EZECHIEL WEINTRAUB, a citizen of the United States, residing at Lynn, in the county of Essex, Commonwealth of Massachusetts, have invented certain new and useful Improvements in the Treatment of Refractory Materials, (division of my application, Serial No. 346,253, filed December 4, 1906,) of which the following is a specification.

This invention relates to methods of purifying and treating refractory materials, and includes a furnace treatment applicable to the fusion of boron and other refractory materials, such, for instance, as have been produced and are being used in the manufacture of glowers or filaments for lamps and furnaces.

I have hereinafter described the treatment as applied to the purification and fusion of boron, but the utility of my invention is not limited in its application to this one material, but is a generic one as applied to the arc treatment of refractory conductors.

The usual method of producing boron includes the reduction of boric anhydrid with magnesium, the general process being to heat a mixture of magnesium with an excess of boric anhydrid. The resulting product is purified, as by washing and fractional decantation. It is in the form of a brown powder, practically non-conductive for electricity, and containing magnesium and other impurities.

To secure conductive boron from the material above described, I compress it into the form of a stick or rod, say six centimeters long and five millimeters in cross section. This stick is then highly heated in a vacuum to dissociate and drive off various of the impurities. For this heating treatment, I may conveniently utilize the vacuum furnace described in United States patent to Arsem, No. 785,535, March 21, 1905. This heat treatment dissociates any magnesium borid which may be present and drives off the magnesium; and, in case any boric anhydrid, $B_2O_3$, is present, that also passes off by direct volatilization. The heat treatment may be continued for several hours at a temperature of say 1200 degrees C., without any danger of contaminating the boron by the carbon of the resistance heater used in the furnace above mentioned. I have mentioned the purification of the boron by this heating in the vacuum, but I find that another very important change takes place, and that the stick, which before treatment was a non-conductor, becomes a relatively good conductor of electricity. The next step in my process consists in melting down this conductive boron by heating it as anode in a vacuum arc. The apparatus for carrying out this step is illustrated in the drawing forming part of this specification, and is hereinafter described in detail.

A hermetically sealed envelop 1 of glass is provided at its bottom with a cup-shaped depression 2 capable of holding a suitable quantity of mercury for use as the cathode of a mercury arc. Suitable lead-wires 3 pass through the glass envelop and serve as means for connecting the mercury to a source of energy. A small tube 4 leads out of this cup-shaped depression or cathode chamber 2 into a well 5 which serves as a receptacle into which mercury may be drawn to lower the surface of the mercury cathode as occasion may require. A suitable stop cock 6 is provided for controlling the flow of mercury into this well. A bottomless cup 7 of alumina is secured in the mercury chamber and projects above the surface of the mercury, and thereby prevents wandering of the cathode spot over against the side of the glass envelop where it might do damage by excessive heating. The upper end of the glass envelop is connected by a tube 9 with a good vacuum pump, and this tube also communicates through suitable valves with a source of hydrogen 10 or other gas, whereby this gas may be admitted to the arc chamber after the latter has been exhausted. A pressure gage 11 serves to indicate the state of the vacuum within the chamber and a small funnel 12 furnishes a ready means for the introduction of mercury through tube 9 into the main chamber of the furnace. From the top of the furnace chamber 1 depends a rod or wire 13 surrounded by a protective sleeve 14 and supporting at its lower end a carbon tube or sleeve within the end of which is secured one end of a stick or rod 15 of the material to be treated or melted.

To start the apparatus into operation, I exhaust the main chamber 1 and the mercury well 5 by means of the vacuum pump, and I then introduce sufficient mercury through funnel 12 to raise the level in the alumina cup 7 until contact is made with the lower end of the stick 15 to be treated. I next introduce a small quantity of gas inert with respect to the material to be treated, as I have found that this addition concentrates the arc on the lower end of the material under treatment and prevents the tendency which the arc would otherwise have of running to the lead-wire 13, this being particularly the case if the material is of lower conductivity than the lead-wire. Various gases may be introduced to produce this concentration of the arc, and in general, I consider that the effect is due to the increased resistance offered to the passage of the arc through the gaseous medium of the envelop, by virtue of which the arc takes the shortest path to the anode and is thereby concentrated on the end thereof. If the stick under treatment consists of boron, I may us hydrogen as the gas; and although the quantity may vary considerably, I prefer to use hydrogen at a pressure of from two and a half to fifteen centimeters of mercury.

To start the arc between the mercury cathode and the solid anode 15, I open the stop cock 6 and allow a small quantity of the cathode mercury to flow through into the well 5, and thereby lower the level of the mercury in cup 7. This produces an arc which can be drawn out to the proper length by further subtraction of the mercury from the cathode.

The heating action of the mercury is so intense and so concentrated that it fuses down the end of the stick into a bead or globule, and I am thereby enabled to obtain relatively large quantities of pure boron in a compact, homogeneous and thoroughly fused mass.

The standard chemical text books describe boron as being a non-conductive material which vaporizes at high temperatures without melting. Such statements in no wise apply to the boron I have produced as above described, for it is a relatively good conductor of electricity, is a dense and solid body and undergoes complete fusion without apparent vaporization.

In the furnace treatment above described, the introduction of an inert gas to secure concentration of the arc on the anode under treatment furnishes an easy means for treating boron, but is not limited in its application to this one material. It has been found of great utility in the treatment of that general class of refractory materials of which boron is typical, such, for instance, as have been produced and are being used in the manufacture of glowers or filaments for lamps and furnaces. I consider that this step in my process is a generic one, as applied to the arc treatment of refractory conductors.

In my parent application, Serial No. 346,253, claims are made on methods for producing boron. In a divisional case, Serial No. 585,391, filed October 5, 1910, claims are made on boron as an article of manufacture. In another divisional case, Serial No. 541,155, filed Nov. 12, 1907, renewed January 31, 1910, claims are made on the apparatus herein disclosed.

What I claim as new, and desire to secure by Letters Patent of the United States, is—

1. The process which consists in treating a conductive body as anode in a mercury arc operating in an inert atmosphere of sufficient density to give a prescribed path to the arc.

2. The process which consists in melting a conductive body used as anode for a mercury vapor arc operating in an atmosphere of an indifferent gas of a few centimeters of mercury.

3. The process which consists in treating a conductive body as anode in a mercury vapor arc operating in hydrogen, to change the physical characteristics of said anode body.

4. The process which consists in melting a refractory body used as anode for a mercury vapor arc, operating in hydrogen at low pressure.

5. The process which consists in melting a refractory element used as anode for a mercury vapor arc, operating in an inert atmosphere of sufficient density to localize the heating action at the end of said anode.

In witness whereof, I have hereunto set my hand this 26th day of October, A. D. 1909.

EZECHIEL WEINTRAUB.

Witnesses:
JOHN A. MCMANUS, Jr.,
CHARLES A. BARNARD.